United States Patent
Morris (10) Patent No.: US 6,657,663 B2
(45) Date of Patent: Dec. 2, 2003

(54) PRE-SUBTRACTING ARCHITECTURE FOR ENABLING MULTIPLE SPECTRUM IMAGE SENSING

(75) Inventor: Tonia G. Morris, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 14 days.

(21) Appl. No.: 09/073,709

(22) Filed: May 6, 1998

(65) Prior Publication Data

US 2003/0112353 A1 Jun. 19, 2003

(51) Int. Cl.$^7$ .................... H04N 5/335; H04N 9/04
(52) U.S. Cl. ........................ 348/273; 348/274
(58) Field of Search ................. 348/273, 274, 348/275, 277, 280, 207, 241, 242, 164, 166, 33, 207.99, 216.1, 308; 250/208.1, 208.2, 339.02, 339.05, 216, 226, 330

(56) References Cited

U.S. PATENT DOCUMENTS

| | | | | |
|---|---|---|---|---|
| 4,573,177 A | * | 2/1986 | Petrosky | 257/216 |
| 5,266,805 A | * | 11/1993 | Edgar | 250/330 |
| 5,282,043 A | * | 1/1994 | Cochard et al. | 348/242 |
| 5,406,391 A | * | 4/1995 | Takahashi | 348/241 |
| 5,452,004 A | * | 9/1995 | Roberts | 348/308 |
| 5,502,299 A | * | 3/1996 | Standley | 250/208.2 |
| 5,557,326 A | * | 9/1996 | Rantasuo et al. | 348/273 |
| 5,648,653 A | * | 7/1997 | Sakamoto et al. | 250/208.1 |
| 5,666,574 A | * | 9/1997 | Ogawa | 250/208.2 |
| 5,892,540 A | * | 4/1999 | Kozlowski et al. | 348/241 |
| 6,137,535 A | * | 10/2000 | Meyers | 250/208.1 |
| 6,154,250 A | * | 11/2000 | Honey et al. | 348/157 |
| 6,195,161 B1 | * | 2/2001 | Edgar | 250/330 |
| 6,211,521 B1 | * | 4/2001 | Bawolek et al. | 250/339.02 |
| 6,292,212 B1 | * | 9/2001 | Zigadlo et al. | 348/273 |
| 6,380,539 B1 | * | 4/2002 | Edgar | 250/399.05 |

* cited by examiner

Primary Examiner—Aung S. Moe
(74) Attorney, Agent, or Firm—Blakely, Sokoloff, Taylor & Zafman LLP

(57) ABSTRACT

A method is provided having the first step of generating a first signal representing a first amount of light detected by a first pixel sensor, where the first amount of light is composed of light in a first spectrum and in a second spectrum. The method continues with generating a second signal representing a second amount of light detected by a second pixel sensor, where the second amount of light is composed of light in the second spectrum. Then, subtracting the second signal from the first signal. An architecture is also provided having a photodiode with a first output signal. A mirror circuit is coupled to the photodiode to duplicate the first output signal into a set of duplicated photodiode output signals. A filter array is coupled to the photodiode having a first infrared pass spectrum.

32 Claims, 6 Drawing Sheets

| R | G | B | IR (R+B) |
|---|---|---|---|
| G | B | IR (R+B) | R |
| B | IR (R+B) | R | G |
| IR (R+B) | R | G | B |

Fig. 9

| R | G | IR (R+B) |
|---|---|---|
| G | B | G |

Fig. 10

| W | IR (R+B) |
|---|---|
| W | W |

Fig. 11

PRE-SUBTRACTING ARCHITECTURE FOR ENABLING MULTIPLE SPECTRUM IMAGE SENSING

BACKGROUND OF THE INVENTION

1. Field of the Invention

The present invention relates to infrared pass filters and pixel sensors, and more particularly, to infrared pass filters and infrared signal correction in an image.

2. Description of Related Art

Imaging sensors or devices based on silicon technology typically require the use of an infrared blocking element somewhere in the optical chain. The purpose of this element is to prevent infrared (IR) energy (typically considered to be light with a wavelength longer than 780 nm) from entering the imaging array. Silicon-based devices will typically be sensitive to light with wavelengths up to approximately 1200 nm. If IR is permitted to enter the array, the device will respond and generate an output image signal based on the detected IR. Since the purpose of an imaging system in the context of consumer photography is to create a representation of the visible light present in a scene, the unwanted IR will introduce a false response and distort the image. In a monochrome (black and white) imaging system, the result can be an obviously distorted rendition. For example, foliage and human skin tones may appear unusually light as they typically radiate more IR energy than their surroundings. In a color imaging system, the introduction of IR will distort the coloration and produce an image with incorrect and de-saturated color.

A common method for preventing IR from reaching the imaging array is to use either ionically colored glass or a thin-film coating on glass to create an optical element which passes only visible light (typically in the range of 380 nm to 780 nm) and blocks IR. This element can be placed in front of the taking lens, located within the lens system, or it can be incorporated into the imager package. The principle disadvantages to this approach are cost and added system complexity. The cost of ionically colored glass element can be as high as approximately $1.50 to $2.00 in volume. Thin film coatings can be implemented at a somewhat lower cost at approximately $0.50 to $1.00 in volume, but suffer from the additional disadvantage of exhibiting a spectral shift as a function of angle. Thus, in an imaging system, thin film coatings do not provide a uniform transmittance characteristic from the center of the image to the edge of the image. Both filter types add to system complexity and cost by introducing an extra piece-part which must be assembled into the imaging system and tested. In addition, both filter types reduce the amount of visible light energy that reaches to the imaging array.

Traditional IR filtering techniques also completely eliminate the detection IR energy. Therefore, these techniques do not work for applications which require the measurement of IR energy to capture an IR "image". For example, these techniques could not be used for imaging applications such as night vision image sensors or mixed mode sensors where IR energy needs to be detected along with visible light energy.

It can therefore be desirable to provide for an imaging system which does not use IR blocking filters, but in which IR does not appreciably affect resulting visible image signals.

SUMMARY OF THE INVENTION

In one embodiment, a method is provided having the first step of generating a first signal representing a first amount of light detected by a first pixel sensor, where the first amount of light is composed of light in a first spectrum and in a second spectrum. The method continues with generating a second signal representing a second amount of light detected by a second pixel sensor, where the second amount of light is composed of light in the second spectrum. Then, the method subtracts the second signal from the first signal. The present invention also provides a system for performing the above method.

DETAILED DESCRIPTION OF THE INVENTION

In the present invention, the effect of IR energy upon an image signal is substantially reduced by electronically subtracting signals generated by IR pixel sensors from signals generated by pixel sensors responsive to both IR and visible light. The IR pixel sensors are sensitive to the IR incident upon the array comprising the sensors, and provide the IR component of the image separately from the color channels of red light spectrum (Red), green light spectrum (Green), and blue light spectrum (Blue). The subtraction is done before the integration of the signals generated by the pixel sensors which are sensitive to both IR and visible light. This allows the integrated value for each of the color components of Red, Green, and Blue (RGB), to be caused by the visible light portion only. This is as opposed to the method of removing the IR portion after integration, which would decrease the dynamic range of the system as to visible light.

The IR sensors can be created using the existing commercial Color Filter Array (CFA) materials, taking advantage of the fact that these materials are transparent to IR radiation. By a simple overlay of two CFA colors (e.g., RB) that have no overlapping transmittance in the visible portion of the spectrum, it is possible to create a composite filter element which blocks the visible light and transmits only IR. If two filters are used to form the composite filter, then each of the two filters has a visible radiation pass spectrum that is disjoint from the other, so that there is no substantial transmittance of visible light through the resulting composite filter formed from the combination of the two filters. In other embodiments, more than two filters are used, each filter having a visible radiation pass spectrum distinct from the other filters such that the resulting composite filter is substantially opaque to visible light. The resulting composite filter element is an IR pass filter, as each of the component filters used to form the composite filter is substantially transparent to IR.

Figure 1:
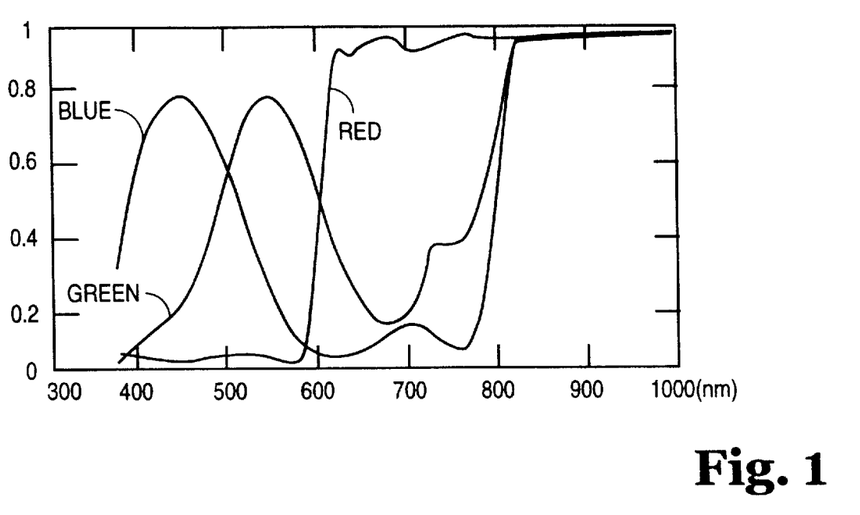
FIG. 1 illustrates the transmittance characteristics for conventional red, green, and blue CFA filters.
Figure 2:
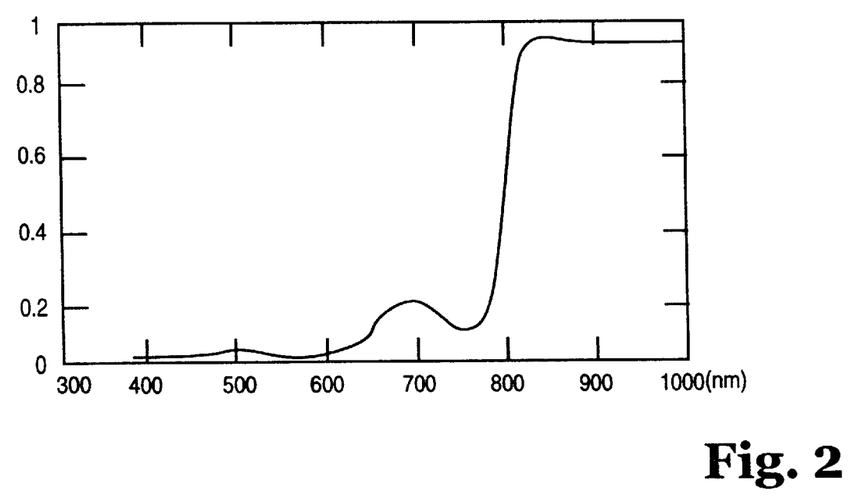
FIG. 2 illustrates the transmittance characteristics of an IR pass filter comprising red and blue CFA filters.

As an example, FIG. 1 shows the transmittance characteristics for conventional red, green, and blue CFA filters, where the vertical axis is the amount of transmissivity and the horizontal axis is the wavelength. Note that each filter is substantially transparent to IR (i.e., each filter has a transmissivity close to 100%). By overlaying red and blue CFA filters, the resulting transmittance of the composite IR pass filter is indicated in FIG. 2, which shows that the visible spectrum is substantially blocked.

The IR pass filter is used to create an IR sensitive pixel, or IR pixel sensor, by depositing the constituent filters making up the IR pass filter over a pixel circuit. This deposition can be accomplished by photo-lithographic techniques well known to the semiconductor industry. A pixel circuit is any circuit which absorbs radiation and provides a signal indicative of the absorbed radiation. For example, the pixel circuit may comprise a photodiode, where photons absorbed by the photodiode generate electron-hole pairs, along with additional circuits to provide an electrical signal, either a voltage or current signal, indicative of the number of photons absorbed by the photodiode.

Figure 3:
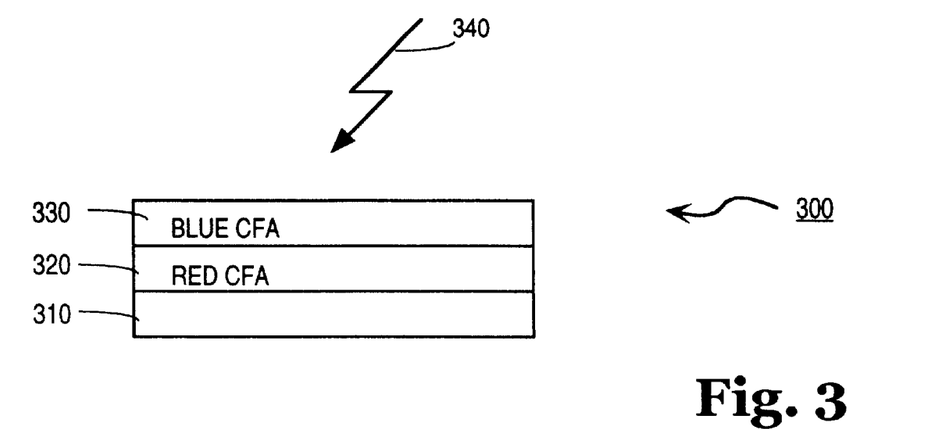
FIG. 3 is a simplified cross-sectional view of a pixel circuit with red and blue CFA filters deposited over the pixel circuit.

In one embodiment, FIG. 3 illustrates a simplified cross-sectional view of an IR pixel sensor 300, comprising pixel circuit 310 with red CFA 320 and blue CFA 330 deposited over pixel circuit 310. Photons in the visible region, incident upon the pixel circuit as pictorially indicated by direction 340, are substantially blocked or prevented from being absorbed by pixel circuit 310.

The elimination of a global IR filter and the combination of several color filters enable the creation of 4 distinct types of sensors: an IR sensor, a Red+IR sensor, a Green+IR sensor, and a Blue+IR sensor. The effective Red, Green, and Blue signals are achieved by subtracting the IR signal from the respective composite signals. This present invention enables better performance in terms of higher dynamic range for the Red, Green, and Blue signals than if the subtraction were to take place in a post-processing stage.

The subtraction takes place via continuous current subtraction before the integration of currents on each of the non-IR color sensors (i.e., the Red, the Green, and the Blue sensors), ensuring that the full range of voltage on the applicable integrating capacitor is allocated for the desired color signal, instead of waiting to subtract an IR signal after integration. The value of the current being subtracted from the integration current is generated from the additional carriers from the IR wavelengths. Therefore, the actual current involved in the integration of charge on the storage capacitor is approximately equal as if only the Red, Green, or Blue wavelengths were causing current to flow through the photodiode. It should be noted that the integration time for the present invention is shorter than the integration time for an imaging array with IR blocking. This is due to the elimination of the IR filter which increases the total amount of light passing through to the individual sensors as the amount of visible light energy that is usually absorbed by the IR filter is now allowed to reach the sensors. In addition, the elimination of the IR filter removes the non-uniform transmissivity characteristics of the IR filter.

In one embodiment, four channels, or four types of signals, are provided. Table I indicates the spectrums measured for each channel or pixel type.

TABLE I

Spectrums for four output channels

| Output Channels | Spectrum |
|---|---|
| Channel 1 | Red + IR |
| Channel 2 | Green + IR |
| Channel 3 | Blue + IR |
| Channel 4 | IR Only |

Figure 4:
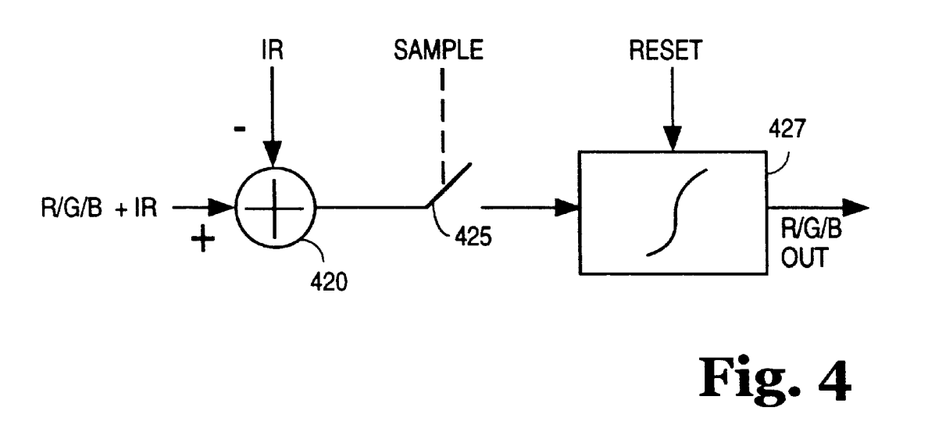
FIG. 4 is a block diagram of a differencing circuit used for subtracting the IR signal from each of the Red, Green, or Blue image signal.

For channels 1-3, the IR component of the image signal as output by channels 4 is removed to provide IR corrected color outputs. One embodiment of a differencing circuit for subtraction of the IR component before integration for each color component is shown by a block diagram such as the one in FIG. 4, where the IR signal on channel 4 is subtracted from each of the signals on channels 1–3 (i.e., RGB) by summing units 420. Thus, the only signal exiting from summing unit 420 is the color component signal, without the IR component. The color component signal (i.e., the Red component signal, the Green component signal, or the Blue component signal), is then integrated by integration unit 427. The integration time is controlled by the RESET signal and a SAMPLE SWITCH 425.

The present invention enables the creation of a pattern that captures Red, Green, Blue, and IR wavelengths without sacrificing image quality of the RGB image. The continuous subtraction of the IR signal before the integration allows for a larger effective voltage range for encoding the Red, Green, or Blue signals. In the system diagram shown, as well as the sample circuit diagrams, the output for the IR sensor is not integrated. Thus the system can handle the IR signal in a way that these values are processed by continuous-time analog processing. In other embodiments, these signals could also be integrated, at the cost of more die area. In addition, if the additional area required for the mirrors is prohibitive, several IR sensors can be averaged before being subtracted from the RGB sensors, thus reducing the number of transistors needed.

Figure 5:
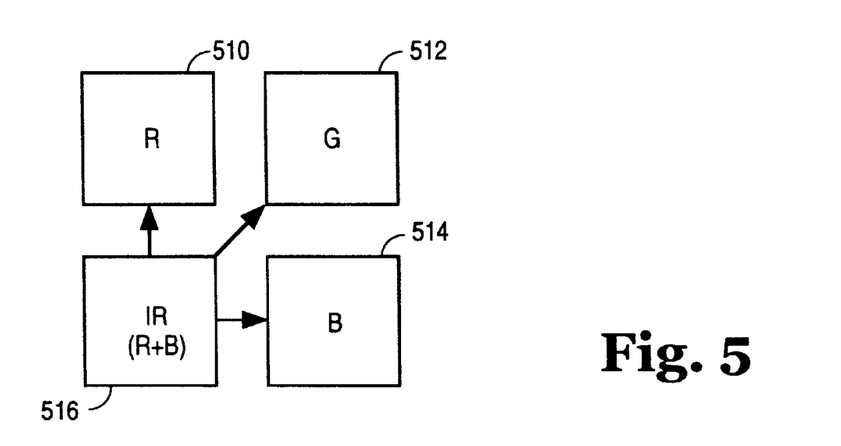
FIG. 5 is a block diagram of an exemplary pixel arrangement showing interpixel communication.
Figure 9:
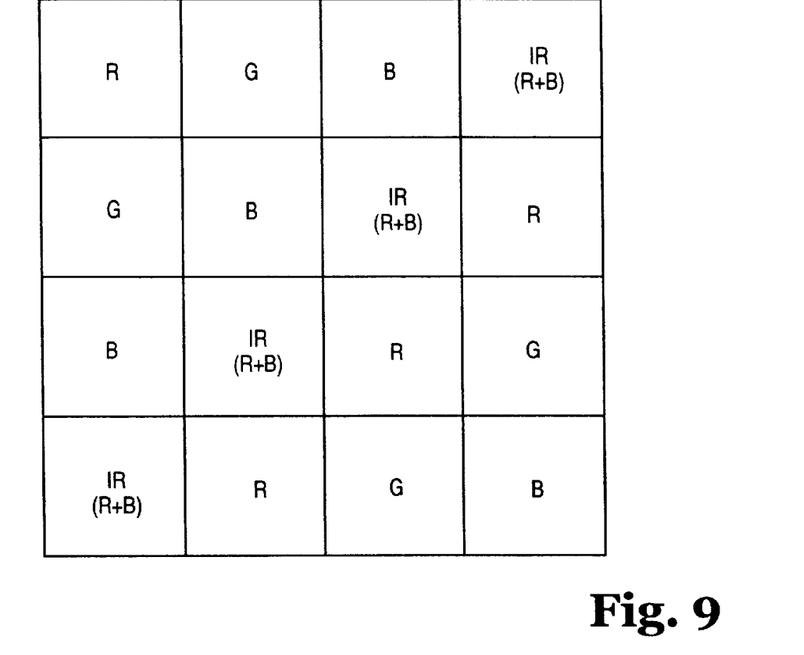
FIGS. 9–10 illustrate tiling patterns for color sensor arrays.
Figure 10:
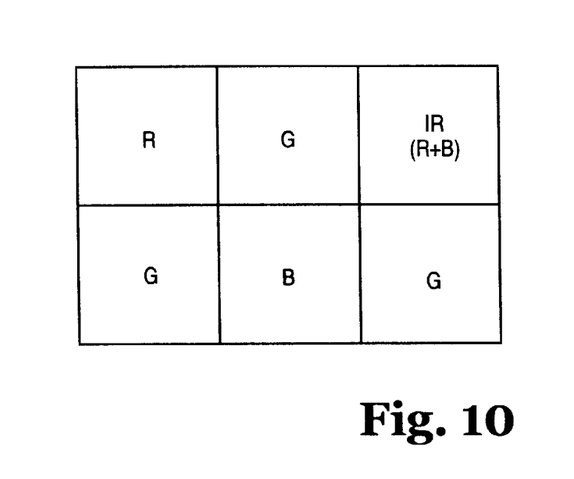
Figure 11:
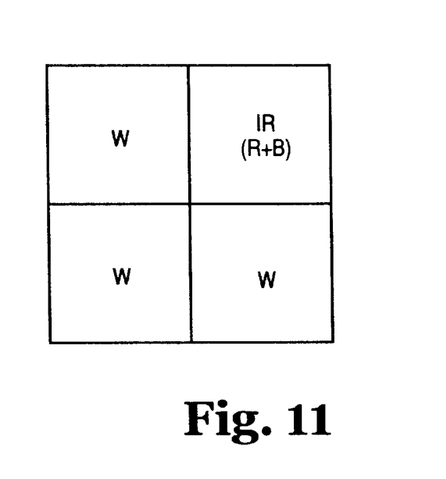
FIG. 11 illustrates a tiling pattern for a monochrome sensor array.

Possible tiling patterns for color images are indicated in FIGS. 5, 9, and 10, and a tiling pattern for a monochrome image is shown in FIG. 11, where W denotes a pixel sensor sensitive to the entire visible spectrum. Each pattern shown in FIGS. 5 and 9–11 may be considered a unit cell. Unit cells are repeated in a regular fashion throughout an imaging array.

In FIGS. 5, 9, and 10, pixel sensors labeled R, G, and B indicate pixel sensors utilizing, respectively, red, green, and blue CFA filters. In FIGS. 5 and 9–11, pixel sensors labeled IR (R+B) are IR pixel sensors in which the composite IR pass filter are red and blue CFA filters as discussed for FIG. 3.

In FIG. 5, a Red pixel sensor 510, a Green pixel sensor 512, and a Blue pixel sensor 514 are positioned next to an IR pixel sensor 516. The arrows from IR sensor 516 to each of the color component pixel sensors represent the flow of the IR component signal from IR pixel sensor 516 to be subtracted from each color component signal. To achieve interpixel communication, and to provide a sufficiently accurate duplication of the original IR component signal for each of the color component pixel sensors (i.e., Red pixel sensor 510, Green pixel sensor 512, and Blue pixel sensor 514), a current mirror circuit is used, as discussed in the description of FIG. 6, below.

Figure 6:
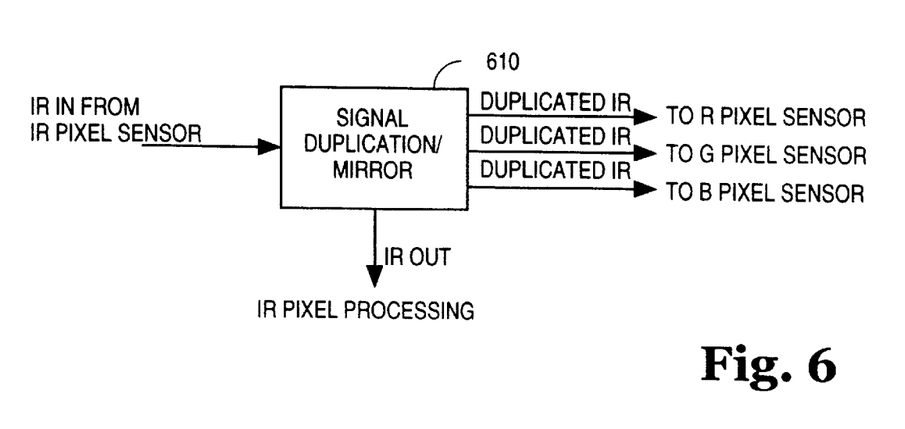
FIG. 6 is a diagram illustrating a signal duplication/mirror unit.

FIG. 6 contains a signal duplication/mirror unit 610 receiving an IR signal from IR pixel sensor 516 and providing mirrored IR signals to Red pixel sensor 510, Green pixel sensor 512, and Blue pixel sensor 514. Signal duplication/mirror unit 610 also provides an output which is a duplicate of the signal from IR pixel sensor 516. Through the use of signal duplication/mirror unit 610, each color pixel sensor receives the same current corresponding to the IR signal detected by IR pixel sensor 516. In addition, the original IR current is duplicated so that IR signals can be measured. It is to be noted that signal/duplication mirror unit 610 can be configured to support as many color pixel sensors and outputs as necessary.

Due to chromatic aberration in the imaging lens system, the IR component of an imaged scene may not be in sharp focus. This is actually an advantage to the embodiments disclosed here because it implies that it is not necessary to sample the IR component with high spatial frequency. This is reflected in the tiling patterns indicated by FIGS. 10 and 11 for color and monochrome imagers, respectively.

Figure 7:
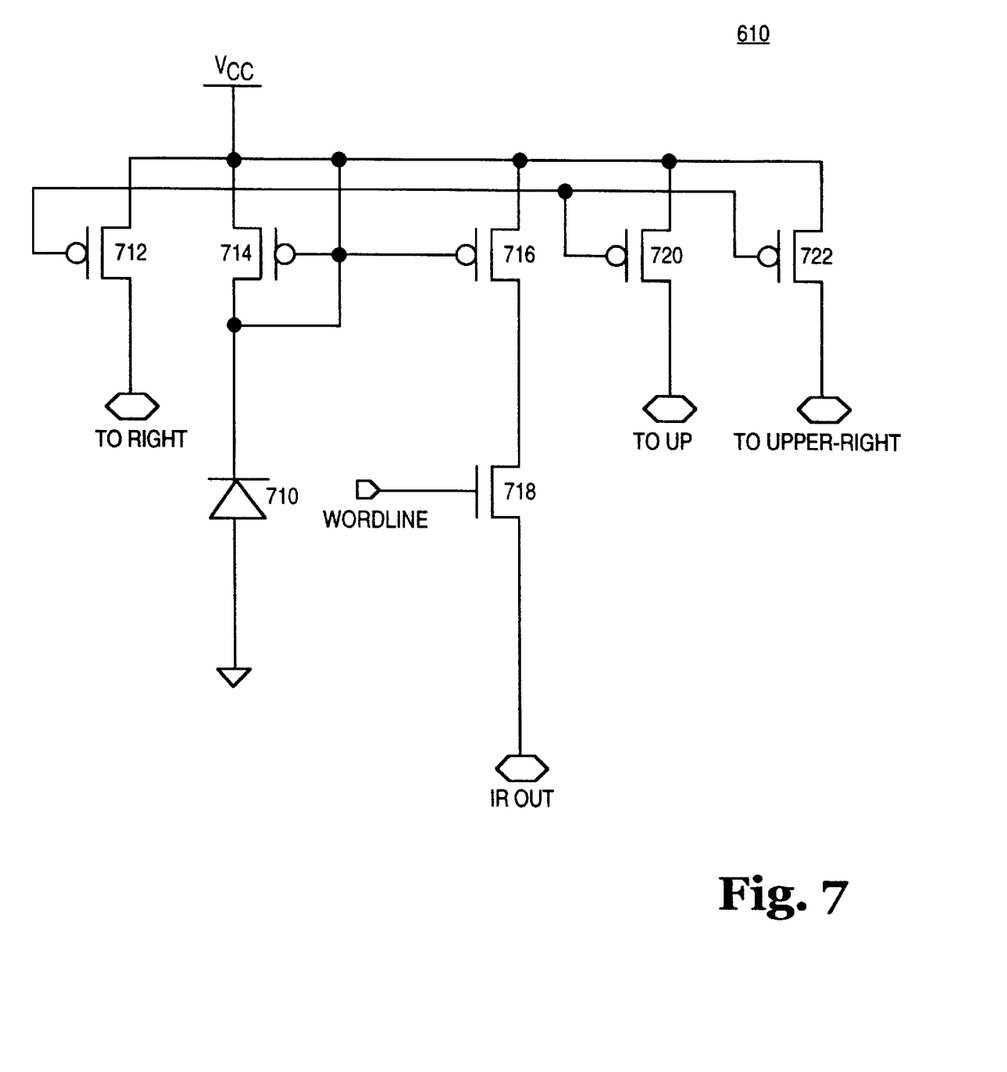
FIG. 7 is a circuit diagram of one embodiment of pixel sensor integrated with a signal duplication/mirror circuit.

FIG. 7 illustrates one embodiment of signal duplication/mirror unit 610 having a photodiode 710. Photodiode 710 generates current in proportion to the amount of IR light received by photodiode 710. As described above, there is one pixel sensor that is only "sensitive" to IR light as it is under an IR-pass filter. Photodiode 710 is part of that pixel sensor. The current generated by photodiode 710 is mirrored through the use of a transistor 714, which provides the mirror signal to a right transistor 712, an up transistor 720, an upper-right transistor 722 and an output transistor 716. Thus, referring back to FIG. 5, right transistor 712 provides the mirroring signal to Blue pixel sensor 514, up transistor 720 provides the mirroring signal to Red pixel sensor 510, and upper-right transistor 722 provides the mirroring signal to Green pixel sensor 512. Output transistor 716 provides a mirror signal to a word line transistor 718 such that the mirror signal of the IR current can be read out.

It is to be noted that in other embodiments, where the layout of IR pixel sensor 516, Red pixel sensor 510, Green pixel sensor 512, and Blue pixel sensor 514 is different or the number of pixel sensors "supported" by IR pixel sensor 516 is different, a different number of mirroring transistors can be used. In one embodiment, each color pixel sensor would have its own mirroring transistor.

Figure 8:
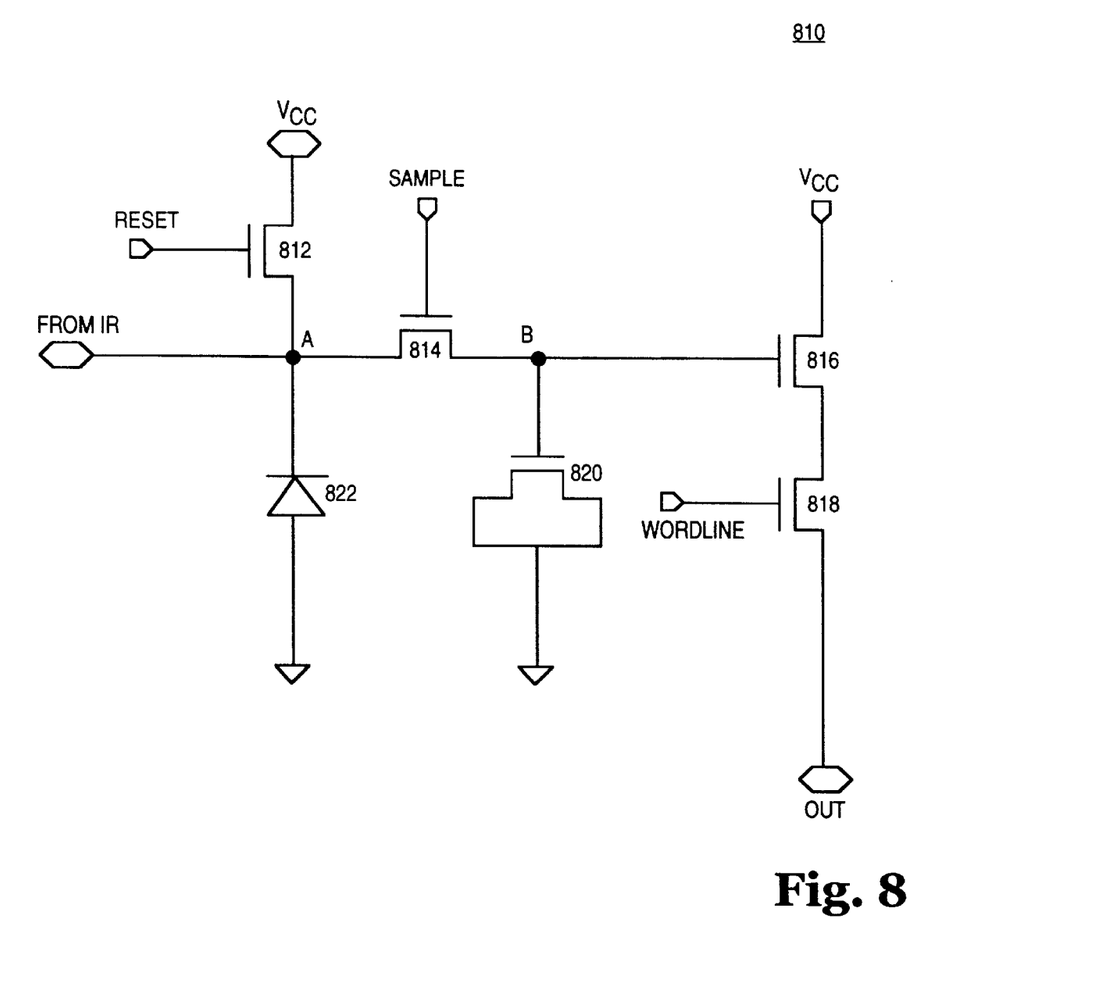
FIG. 8 is a circuit diagram of one embodiment of a color pixel sensor which can be used with the IR pixel sensor of FIG. 7.

FIG. 8 is a pixel sensor circuit which is used for each color pixel sensor. Pixel sensor circuit 810 has a photodiode 822 coupled to a RESET transistor 812 which receives a RESET signal at node A before integration time. Coupled to node A is a SAMPLE transistor 814 which receives a SAMPLE signal to allow the transfer of charge from node A to node B to a storage transistor 820. Storage transistor 820 is basically a transistor that is connected to act like a capacitor. Also coupled to node B is an output transistor 816. Transistor 816 outputs its signal to a word line transistor 818 which receives a word line signal to operate the output of a signal which represents the charge stored on storage transistor 820. As seen in FIG. 8, node A receives the current mirrored value from duplication/mirror unit 610 such that the current which represents the amount of infrared light detected by IR pixel sensor 516 is subtracted from the IR plus color light which is detected by photodiode 822.

In operation, before an image is captured, a RESET signal is provided to RESET transistor 812 while a SAMPLE signal is also provided to SAMPLE transistor 814 so as to bring nodes A and B to a one transistor voltage drop below $V_{CC}$. The RESET signal is then deasserted from RESET transistor 812 and photodiode 822 will cause the voltage at nodes A and B to decay in a rate that is proportional to the amount of light that is reaching photodiode 822. As described above, this light is composed of the color component plus an additional infrared component as photodiode 822 sits under a filter that passes through the color light of interest plus the infrared light. Without the effect from duplication/mirror unit 610, the voltages at node A and B will decay more rapidly than if photodiode 822 is under a filter which filters out IR light. However, as photodiode 822 is allowed to be responsive to both the color light of interest and IR light, the voltage and node A and B will decay at a rate which is proportional to the amount of light received form the color component and the IR component. Thus, for example, if the color component is responsible for one part of the current that is decaying the voltage at node A, and if the effect of the IR component is the same as the color component, then together, the color component and the IR component of the light received will cause twice the amount of decay in the same amount of time than if only the color or the IR component alone.

However, in the present invention, a mirrored current which is derived from photodiode 710 in duplication/mirror unit 610 is supplied to node A to subtract the component of the current which is caused by IR light. Thus, the only remaining current which decays the voltages at nodes A and B result from the color component of the light received by photodiode 822. In one embodiment, photodiode 710 has substantially the same characteristics as photodiode 822.

For example, pixel sensor circuit 810 is the pixel sensor circuit for Blue pixel sensor 514, which is located to the right of IR pixel sensor 516. The output of right transistor 712 is connected to node A of pixel sensor circuit 810 to continually subtract the current generated by the IR component of light received by photodiode 822 during integration.

An imaging array with IR pixel sensors, whether monochrome or color, may be used in a second mode as an IR imaging array, where only the signals from the IR pixel sensors are utilized to form an IR image. Thus, imaging arrays made according to the embodiments disclosed here may be configured as dual mode imaging arrays, providing either an IR corrected visible image or an IR image.

The ability to sense IR wavelengths via a specific sensor within an imaging array can facilitate the creation of special systems. Patterns of IR light can be projected onto an object, thus simplifying localization tasks necessary for stereo-matching in 3-D capture. The use of IR enables extraction of the projected pattern in a straight-forward manner without significantly affecting the capture of Red, Green, or Blue signals. The detection of the IR signal is all that is necessary to segment the projected pattern from the natural image. The pre-subtracting architecture described herein provides that the four bands of wavelength are sensed in a manner that does not appreciably sacrifice image quality of the RGB image.

Embodiments with other color systems may be realized, such as cyan, magenta and yellow (CMY) systems and magenta, white, and yellow (MWY) systems. In the case of the CMY color system, it would be necessary to overlay all three colors to block visible light. The approach could be extended to the MWY color system as well, but would require additional processing to add a third color (e.g., blue or cyan). This color is required to enable complete blocking of the visible light in an IR sensing pixel. Various modifications may be made to the above described embodiments without departing from the scope of the invention as defined below.

What is claimed is:

1. An apparatus comprising:
   a photodiode having a first output signal;
   a filter array coupled to said photodiode having a first pass spectrum;
   a mirror circuit coupled to said photodiode to duplicate said first output signal into a set of duplicated photodiode output signals;
   a first pixel sensor photodiode having an output;
   a first pixel sensor filter array coupled to said first pixel sensor having a second pass spectrum;
   a reset device coupled to said output of said first pixel sensor photodiode; and,
   a sample and store circuit coupled to said output of said first pixel sensor photodiode and also coupled to one of said set of duplicated photodiode output signals from said mirror circuit;
   where said one of said set of duplicated photodiode output signals is combined with said first pixel sensor photodiode output.

2. The apparatus of claim 1, where said filter array is configured to have said first pass spectrum be light that is greater than approximately 780 nanometers.

3. The apparatus of claim 1, where said filter array is composed of a red pass filter and a blue pass filter.

4. The apparatus of claim 1, where said first pixel sensor filter array is configured to have said second pass spectrum be light substantially in the range of 390 to 780 nanometers.

5. The apparatus of claim 1, where combination of said one of said set of duplicated photodiode output signals and said first pixel sensor photodiode output decreases said first pixel sensor photodiode output by a first amount.

6. The apparatus of claim 5, where said first amount is substantially equal to a signal level generated by said first pixel sensor photodiode detecting light in said first pass spectrum.

7. The apparatus of claim 1, where said mirror circuit comprises:
   a first transistor device coupled to said photodiode; and
   a second transistor device coupled to said first transistor device to form a current mirror.

8. The apparatus of claim 7, where said mirror circuit further comprises a third transistor device coupled to said first transistor device to form a second current mirror.

9. The apparatus of claim 8, where said second current mirror has an output substantially equal to output of said current mirror.

10. An apparatus comprising:
    a first pixel sensor, of a visible imaging array, that is responsive to infrared light and to visible light;
    a second pixel sensor, of said visible imaging array, that is responsive to infrared light and not visible light; and
    a subtraction circuit coupled to the first and second sensors to subtract, from an image current of the first sensor, an image current of the second sensor, before integration of the subtracted from image current.

11. The apparatus of claim 10 wherein the first sensor includes a pixel circuit overlaid by a filter element that is part of a color filter array (CFA) and is transparent to infrared light, and the second sensor includes another pixel circuit that is overlaid by a composite filter element that is made of two overlaid filter elements of the CFA.

12. The apparatus of claim 11 wherein the two overlaid filter elements have transmittances across the visible spectrum that do not overlap.

13. The apparatus of claim 12 wherein the two overlaid filter elements have red and blue transmittances.

14. The apparatus of claim 11 wherein the composite filter element is made of a third overlaid filter element of the CFA.

15. The apparatus of claim 11 wherein the pixel circuit of the first sensor includes a photodiode and a capacitor, the photodiode to conduct the image current of the first sensor responsive to infrared light and to visible light, the capacitor being coupled to integrate the image current conducted by the photodiode.

16. The apparatus of claim 15 wherein the pixel circuit of the second sensor includes a photodiode having substantially the same characteristics as the photodiode in the first sensor, to conduct the image current of the second sensor responsive to infrared light.

17. The apparatus of claim 16 wherein the subtraction circuit includes a current mirror to mirror the image current conducted by the photodiode of the second sensor out of a node of the photodiode of the first sensor.

18. The apparatus of claim 16 wherein the pixel circuit of the second sensor further includes a capacitor being coupled to integrate the image current conducted by the photodiode of the second sensor.

19. The apparatus claim 18 wherein the pixel circuits of the first and second sensors further include circuitry that is responsive to a wordline signal and that allows the readout of the integrated image currents, and wherein the first and second sensors are part of a dual mode imaging array capable of visible color imaging and infrared imaging for 3-D capture.

20. An apparatus comprising:
    means for simultaneously sensing incident infrared light and incident visible light of a plurality of colors;
    means for sensing said incident infrared light and not said incident visible light; and
    means for increasing a dynamic range of the simultaneous sensor means for purposes of detecting visible light of the plurality of colors.

21. An apparatus comprising:
    a plurality first pixel sensors, that are part of a visible imaging array, to provide a plurality of first currents, respectively, each of the plurality of first currents being an indication of infrared light and visible light of a respective color absorbed by a respective one of the plurality of first sensors;
    a second pixel sensor, part of said visible imaging array, to provide a second current being an indication of infrared light, and not visible light, absorbed by the second sensor;
    a continuous subtractor having an input to receive one of the plurality of first currents, and another input to receive the second current;
    an integrator to integrate an input current; and
    a switch coupled between an output of the subtractor and the integrator.

22. The apparatus of claim 21 wherein each of the plurality of first sensors includes a pixel circuit overlaid by a filter element that is part of the same color filter array (CFA) and is transparent to infrared light, and the second sensor includes a pixel circuit that is overlaid by a composite filter element that is made of two overlaid filter elements of said CFA.

23. The apparatus of claim 22 wherein the two overlaid filter elements have transmittances across the visible spectrum that do not overlap.

24. The apparatus of claim 22 wherein the two overlaid filter elements have red and blue transmittances.

25. The apparatus of claim 22 wherein the pixel circuit of the second sensor further includes a capacitor being coupled to integrate the image current conducted by the photodiode of the second sensor.

26. The apparatus claim 25 wherein the pixel circuits of the first and second sensors further include circuitry that is responsive to a wordline signal and that allows the readout of the integrated image currents, and wherein the first and second sensors are part of a dual mode imaging array capable of visible color imaging and infrared imaging for 3-D capture.

27. The apparatus of claim 21 wherein the pixel circuit in each of the plurality of first sensors includes a photodiode and a capacitor, the photodiode to conduct the image current of the first sensor responsive to infrared light and to visible light, the capacitor being coupled to integrate the image current conducted by the photodiode.

28. The apparatus of claim 27 wherein the pixel circuit in the second sensor includes a photodiode substantially similar to the photodiodes in the plurality of first sensors, to conduct the image current of the second sensor responsive to infrared light.

29. The apparatus of claim 28 wherein the subtraction circuit includes a current mirror to mirror the image current, that is conducted by the photodiode of the second sensor, out of a node of the photodiode of the first sensor.

30. A method comprising:

generating a plurality of first signals in response to visible light of a plurality of colors, respectively, incident on an imaging array, the plurality of first signals being generated also in response to infrared light incident on the array;

generating a second signal in response to said incident infrared light and not said incident visible light;

subtracting from each of the plurality of first signals an amount of the second signal to yield a plurality of first color signals; and integrating each of the plurality of first color signals to indicate detection by the array of said incident visible light of the plurality of colors, respectively.

31. The method of claim 30 further comprising:

integrating an amount of the second signal to indicate detection by the array of said incident infrared light.

32. The method of claim 30 wherein the subtraction is performed by duplicating the second signal and subtracting a duplicate of the second signal from each of the plurality of signals to yield the plurality of first color signals.

* * * * *